(12) United States Patent
Valsamis et al.

(10) Patent No.: US 6,494,607 B2
(45) Date of Patent: Dec. 17, 2002

(54) FOUR WING, NON-INTERMESHING ROTORS FOR SYNCHRONOUS DRIVE TO PROVIDE IMPROVED DISPERSIVE AND DISTRIBUTIVE MIXING IN INTERNAL BATCH MIXERS

(75) Inventors: Lefteris Valsamis, Stratford, CT (US);
Frank Borzenski, Branford, CT (US);
Robert Wagner, Fairfield, CT (US);
Walter Rapetski, Orange, CT (US);
Hans Baurmeister, Londonderry, VT (US)

(73) Assignee: Farrel Corporation, Ansonia, CT (US)

( * ) Notice: Subject to any disclaimer, the term of this patent is extended or adjusted under 35 U.S.C. 154(b) by 81 days.

(21) Appl. No.: 09/849,058

(22) Filed: May 4, 2001

(65) Prior Publication Data

US 2002/0163852 A1 Nov. 7, 2002

(51) Int. Cl.$^7$ .................................. B29B 7/18
(52) U.S. Cl. ........................................ 366/84
(58) Field of Search .................. 366/83–85, 88, 366/97–99, 86, 297–301, 318, 319, 321, 322, 323, 324; 425/204, 205, 207–209

(56) References Cited

U.S. PATENT DOCUMENTS

| 4,714,350 A | 12/1987 | Nortey | 366/84 |
|---|---|---|---|
| 4,744,668 A | 5/1988 | Nortey | 366/76 |
| 4,834,543 A | 5/1989 | Nortey | 366/97 |
| 4,893,936 A | 1/1990 | Borzenski et al. | 366/76 |
| 5,044,760 A | 9/1991 | Asai | 366/97 |
| 6,402,360 B1 | 6/2002 | Nortey | 366/85 |

FOREIGN PATENT DOCUMENTS

DE    738787    7/1943

OTHER PUBLICATIONS

Rubber & Plastics News, pp. 18–20, Oct. 18, 1999.

N. Nortey, "Enhanced Mixing in Intermeshing Batch Mixer", Paper # 70, Rubber Division, American Chemical Society, Sep. 29–Oct. 2, 1998.

PCT Search report of PCT/US02/06103.

*Primary Examiner*—Charles E. Cooley
*Assistant Examiner*—David Sorkin
(74) *Attorney, Agent, or Firm*—George W. Rauchfuss, Jr.; Ohlandt, Greeley, Ruggiero & Perle LLP (57) ABSTRACT

Four wing rotors for used in an internal batch mixer. The rotor has two long wings, and these two long wings have different approach angles and helix angles. The rotor has two short wings and these short wings also preferably have different helix angles and approach angles. The rotors provide improved distributive and dispersive mixing allowing for greater productivity in processing materials and producing more homogeneously mixed materials at lower discharge temperatures.

34 Claims, 4 Drawing Sheets

FOUR WING, NON-INTERMESHING ROTORS FOR SYNCHRONOUS DRIVE TO PROVIDE IMPROVED DISPERSIVE AND DISTRIBUTIVE MIXING IN INTERNAL BATCH MIXERS

FIELD OF THE INVENTION

This invention relates to improved rotors for internal batch mixing machines having two counter-rotating, non-intermeshing four wing rotors. The four-winged rotors of this invention provide improved dispersive and distributive mixing of materials in the batch mixer. The invention also relates to batch mixing machines employing two of the new four-wing rotors of this invention, and to improved batch mixing utilizing such batch mixing machines having the improved four-wing rotors.

BACKGROUND TO THE INVENTION

This invention relates to high intensity internal mixing machines of the batch type having a mixing chamber shaped to accommodate two counter-rotating non-intermeshing winged rotors. The batch of ingredients to be mixed into a homogeneous mass is fed down into the mixing chamber through a vertical chute and is pushed down under pressure by a ram located in the chute. This ram is hydraulically or pneumatically driven. The lower face of the ram, when advanced down to its operating position during mixing of the batch, forms an upper portion of the mixing chamber. The homogeneous mixture produced is removed from the mixing chamber through a discharge opening at the bottom of the chamber, and a door associated with this opening is then closed in readiness for the next batch of ingredients to be introduced down through the chute.

Some internal batch mixing machines are designed with non-intermeshing rotors, and others have intermeshing rotors. Intermeshing rotors must always be driven at the same rotational speed in synchronized relationship; non-intermeshing rotors may be driven at the same rotational speed or at different rotational speeds for achieving different mixing and kneading effects. The present invention relates to the non-intermeshing type. The wings of the rotors have a generally helical configuration, and they produce high intensity mixing and homogenization by the co-operative interaction of their various forceful dynamic effects, as described later. For further information about such internal batch mixers, having non-intermeshing rotors, reference may be made to U.S. Pat. Nos. 1,200,070 and 3,610,585, assigned to predecessors of the present assignee and to recent U.S. Pat. Nos. 4,744,668 and 4,834,543, and the disclosures of these patents are incorporated herein by reference as background information.

A large majority of all internal batch mixing machines in commercial usage today in the United States having non-intermeshing rotors are operated non-synchronously, i.e. with the rotors being driven at different rotational speeds, often called "friction ratio" operating mode. For example, a typical non-synchronous operation causes one rotor to make 9 revolutions versus 8 revolutions for the other rotor, i.e. a "friction ratio" of 9 to 8 or 1.125 to 1.

In U.S. Pat. No. 4,744,668, issued May 17, 1988, are described novel four-wing and three-wing rotors of increased performance adapted for use in either the currently more numerous non-synchronous batch mixers or synchronous batch mixers.

U.S. Pat. No. 4,834,543 describes four-wing, non-intermeshing rotors to be driven at synchronous speed at a constant 180° phase angle, with each of the two rotors used in the batch mixing machine having two long wings and two short wings on each of the two rotors.

In both U.S. Pat. Nos. 4,744,668 and 4,834,543, there is a recognition that optimum or preferred results are achieved by driving the specified rotors synchronously while oriented in a preferred phase angle relationship. The patent specifies that preferred phase angle relationship as being about 180°.

The four-wing, non-intermeshing (tangential) rotors heretofore proposed for use with synchronous rotation internal batch mixing machines have either been of the type that promote primarily micro dispersive (intensive) mixing due to the intensive shear forces generated by the rotors in the mixer chamber. In dispersive mixing the high shear forces generated rapidly break down agglomerates in the batch of materials to be mixed. The non-intermeshing rotors also have the properties of providing high fill factors and short feeding and discharge times along with the excellent dispersive mixing characteristics. However, such non-intermeshing rotors do not provide essentially equally good distributive (extensive) mixing of the materials to be mixed. Also, use of such non-intermeshing rotors can be characterized by an undesirable temperature rise in the material to be mixed.

On the other hand, mixing machines heretofore employing intermeshing rotors have better heat transfer characteristics and better thermal control over the mixing batch. Also, in contrast to the mixing machines employing the non-intermeshing rotors, the machines employing intermeshing rotors exert high elongational deformations in the nip region between the two rotors producing good stream splitting and thus good distributive mixing. In contrast, in the mixing machine employing non-intermeshing rotors only mild stream splitting is produced in this region and therefore generally does not produce essentially equivalent distributive mixing. There is therefore a need for rotors for use in batch mixers that simultaneously produce both good dispersive and good distributive mixing in the processing of the batch of materials to be mixed and thereby obtain the benefit of both intermeshing and non-intermeshing rotors.

SUMMARY OF THE INVENTION

This invention provides a new four-wing rotor design in which each rotor wing performs a specific function, and use of these rotors as synchronously driven rotors in mixing machines to produce both good dispersive and good distributive mixing of the mixing batch and good process temperature control, and thereby provide better utilization of the mixing chamber of the mixer and yield a more thermally and compositionally homogeneous mixed product. In the rotors of this invention certain wings promote primarily dispersive mixing and certain wings promote primarily distributive mixing in the batch.

A further feature of this invention is that use of the new rotors in the mixing machines enforces certain flow patterns in the window of interaction between the two rotors in the mixer and produces more efficient exchange of material between one rotor chamber and the other rotor chamber of the mixer. This function is accomplished in part by a rotor with wings having a substantial helical length such that there is present in the window of interaction between the two rotors a rotor wing almost at all times. This allows great flexibility in affecting the flow patterns in the window of interaction between the two rotors Another feature of this invention is the ability to essentially eliminate any area of possible stagnation within the mixing chamber through the wing design of this invention and appropriate alignment of the rotors in the mixing machine. A still further feature of this invention is the ability to vary mixing intensities during the mixing cycle due to the geometries of the new winged rotors of this invention along with the rotor speeds employed.

The four wing rotor of this invention, for non-intermeshing synchronous rotation with an identical four wing non-intermeshing rotor in an internal, intensive batch mixing machine having synchronous drive means, comprises a rotor having an axis and an axial length from a first end of the rotor to an opposite second end of the rotor and having four wings of generally helical configuration including first and second long wings and first and second short wings. The first long wing originates at the first end of the rotor at about 0° angular position relative to the rotor axis and has a wing tip oriented to the rotor axis at a helix angle of between about 45° and 60° and has an axial length of between about 60% to about 80% of the axial length of the rotor. The first long wing has an approach angle of from about 25° to 60°. The second long wing on the rotor originates at the second end of the rotor at about 220° to about 240° angular position relative to the rotor axis and has a wing tip oriented to the rotor axis at a helix angle of between about 20° to 40° and has an axial length of between about 60% to 80% of the axial length of the rotor. The second long wing has an approach angle of between about 15° to 25°. The wing tips of each of the first and second long wings have a width, as measured normal to the helix angle of the wing, with the width of the first long wing tip being at least 50% and up to about 100% wider than the width of the second long wing tip. The first short wing on the rotor originates at the first end of the rotor at an angular position in the range of about 170° to about 190° relative to the rotor axis, and has its wing tip oriented to the rotor axis at a helix angle of in the range of from about 25° to 60°, and preferably essentially equal to the helix angle of the wing tip of the first long rotor, and has an axial length of between about 10% and 30% of the axial length of the rotor. The second short wing on the rotor originates at the second end of the rotor at an angular position in the range of about 350° to about 20° relative to the rotor axis, has its wing tip oriented to the rotor axis at a helix angle in the range of about 25° to 60°, and preferably essentially equal to the helix angle of the wing tip of the second long rotor, and has an axial length of between about 10% and 30% of the axial length of the rotor. Each of the first and second long wings and first and second short wings have their wing tips an essentially equivalent radial distance from the axis of the rotor.

When two of these rotors are placed in a synchronously operated batch mixer, the rotors are oriented in the mixing chamber of the mixer such that the leading edge of the helical wing tip of the first long wing of the first rotor is located at a collar of the first rotor that is at an opposite end of the mixing chamber from the collar of the second rotor from where the leading edge of the helical wing tip of the first long wing of the second rotor is located. Additionally, the two rotors are positioned in the mixing chamber so that during their non-intermeshing counter rotation the leading edge of the helical wing tip of the first long wing of the second rotor trails the leading edge of the helical wing tip of the first long wing of the first rotor in rotating through the window of interaction between the two rotors by from 90° to 180°, preferably about 90°. In this orientation of about 90°, and as a result of the twist angles of the wings of the two rotors, each rotor wing provides an effective wiping of the processing surfaces of the adjacent rotor thus providing effective material renewal on these surfaces. The large and small wings on the two rotors essentially completely wipe the entire region of the mixer in the space between the two rotors thus ensuring further enhancement of distributive mixing. Other angular positions of the aforementioned rotor alignments greater than 90° and up to 180° difference can be employed to promote other aspects of the mixing process, such as for example material uptake and discharge from the mixer. In such increased angular positions of the originating points of the leading edges of the helical wing tips of the first long wings on the two rotors, a wider open space between the two rotors is provided at one angular position followed by a complete sweep of the region by the other rotor wings when the latter cross the window of interaction of the two rotors.

BRIEF DESCRIPTION OF THE DRAWINGS

The invention is illustrated by, but limited to the invention as shown in the attached drawings in which.

DETAILED DESCRIPTION OF THE INVENTION

Figure 1:
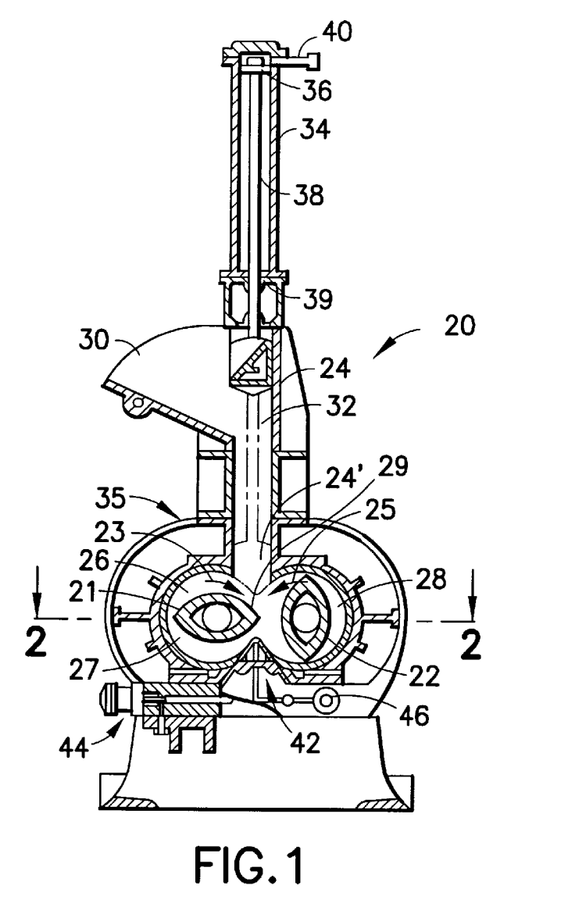
FIG. 1 is an elevational view of an internal batch mixing machine for employing the rotors of this invention, with portions of the mixing machine shown in section.

As shown in FIG. 1, a high intensity internal mixing machine of the batch type, generally indicated at 20, in which a pair of non-intermeshing rotors 21 and 22 embodying the present invention can be used to advantage includes a vertically reciprocatable ram 24 movable between a raised position shown in FIG. 1 and a lowered operating position 24' shown in dashed outline. This ram 24 is used to move ingredients to be mixed down into a mixing chamber 26. In its operating position 24', it opposes the forces exerted by materials in the mixing chamber 26 as they are being thoroughly and intensely mixed by the wings to be described later on the two counter-rotating rotors 21 and 22, which are turned about spaced parallel horizontal axes, as shown by arrows 23 and 25. The left rotor 21 as seen in FIG. 1, is turned in a clockwise direction about its axis and the right rotor 22 in a counterclockwise direction. The mixing chamber 26 is shaped to accommodate these two rotors and includes left and right chamber cavities 27 and 28 each of generally circular cylindrical shape. These chamber cavities are positioned in horizontally opposed relationship open toward each other. There is a central region 29 of the mixing chamber 26 that is defined as being located generally between the two rotors 21 and 22.

The ingredients to be mixed are initially introduced into a hopper 30, while the ram 24 is raised, so that the ingredients can enter a chute 32 communicating with the hopper 30 and leading down into the central region 2 of the mixing chamber 26. Then the ram is lowered to push the ingredients down into the mixing chamber and to retain them therein. This ram is shown being operated by a fluid-actuated drive cylinder 34, mounted at the top of the overall housing 35 of the mixing machine 20. The fluid cylinder 34, which may be hydraulic or pneumatic, contains a double-acting piston 36 with a piston rod 38 connected to the ram 24 for lowering and raising the ram. The ram is secured to the lower end of the piston rod 38 below the bottom end 39 of the cylinder 34. Actuating fluid under the desired pressure is fed through a supply line 40 into the upper portion of the cylinder 34 for urging the piston 36 downwardly to the lowered operating position 24'. After the mixing operation has been completed, the ram is retracted back up to its raised position by actuating fluid fed into the cylinder 34 below the piston 36 through a supply line not seen in FIG. 1.

The mixed and homogenized materials are discharged from the bottom of the mixing chamber 26 through a discharge opening normally closed by a door 42 which is held in its closed position during mixing operation by a locking mechanism 44. The door 42 when released by the locking mechanism 44 is swung down around a hinge shaft 46. The door is swung, for example, by a pair of hydraulic torque motors, not shown, mounted on opposite ends of the hinge shaft 46.

Figure 2:
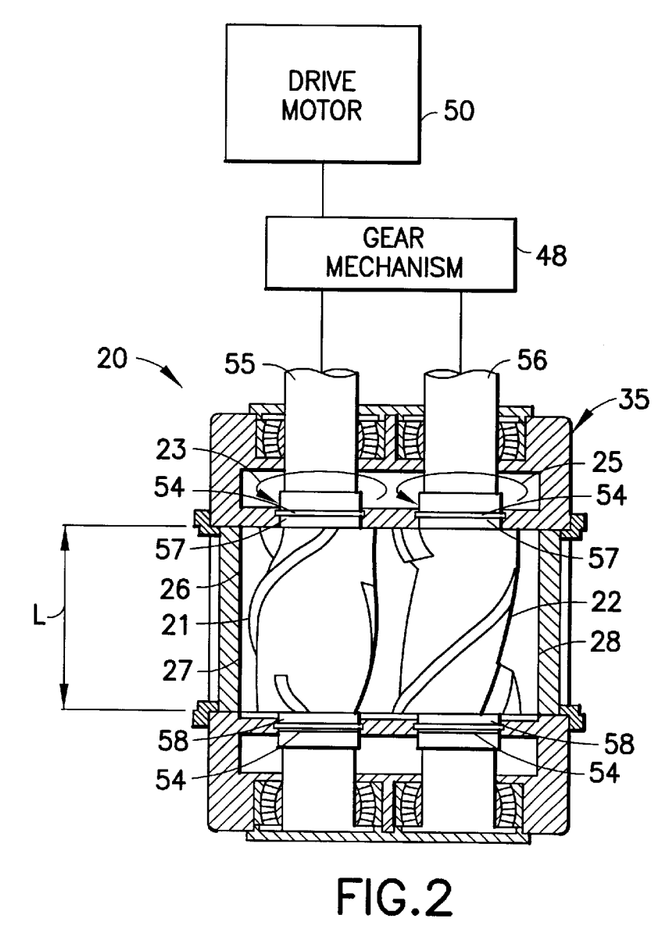
FIG. 2 is an enlarged plan sectional view taken along line 2—2 in FIG. 1 through the mixing chamber.

FIG. 2 is a plan sectional view of the mixing mechanism 20 of FIG. 1 taken along the line 2—2. The rotors 21 and 22 are rotated in opposite directions 23, 25 by a gear mechanism 48 that is driven by a drive motor 50. This gear mechanism 48 comprises identical meshing gears for driving the rotors at the same, namely synchronous, speed. The drive motor 50 may be of conventional configuration and preferably includes speed control means for varying the speed of rotation for the rotors, as desired, depending upon the particular ingredients in the mixing chamber 26 and their temperature and viscous state, and depending upon the desired rate of mixing power to be delivered by the rotors.

There are conventional sealing collars 54 (FIG. 2) located immediately adjacent to each end of each rotor for sealing the mixing chamber 26. The ends of the rotors adjacent to the respective collars 54 are often called the "collar end".

Figure 3:
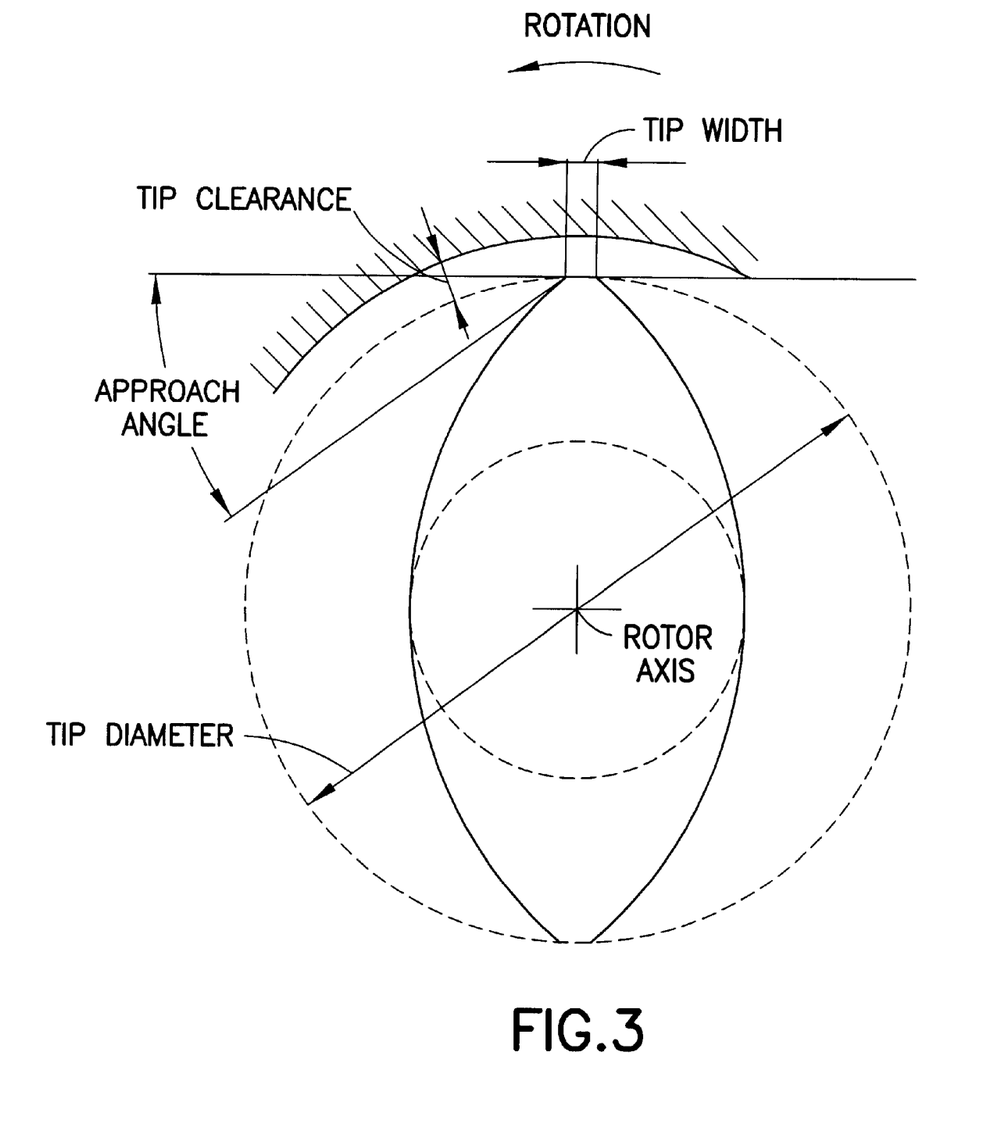
FIG. 3 is a diagrammatic illustration to show the meaning of rotor profile terminology used in this application.
Figure 5:
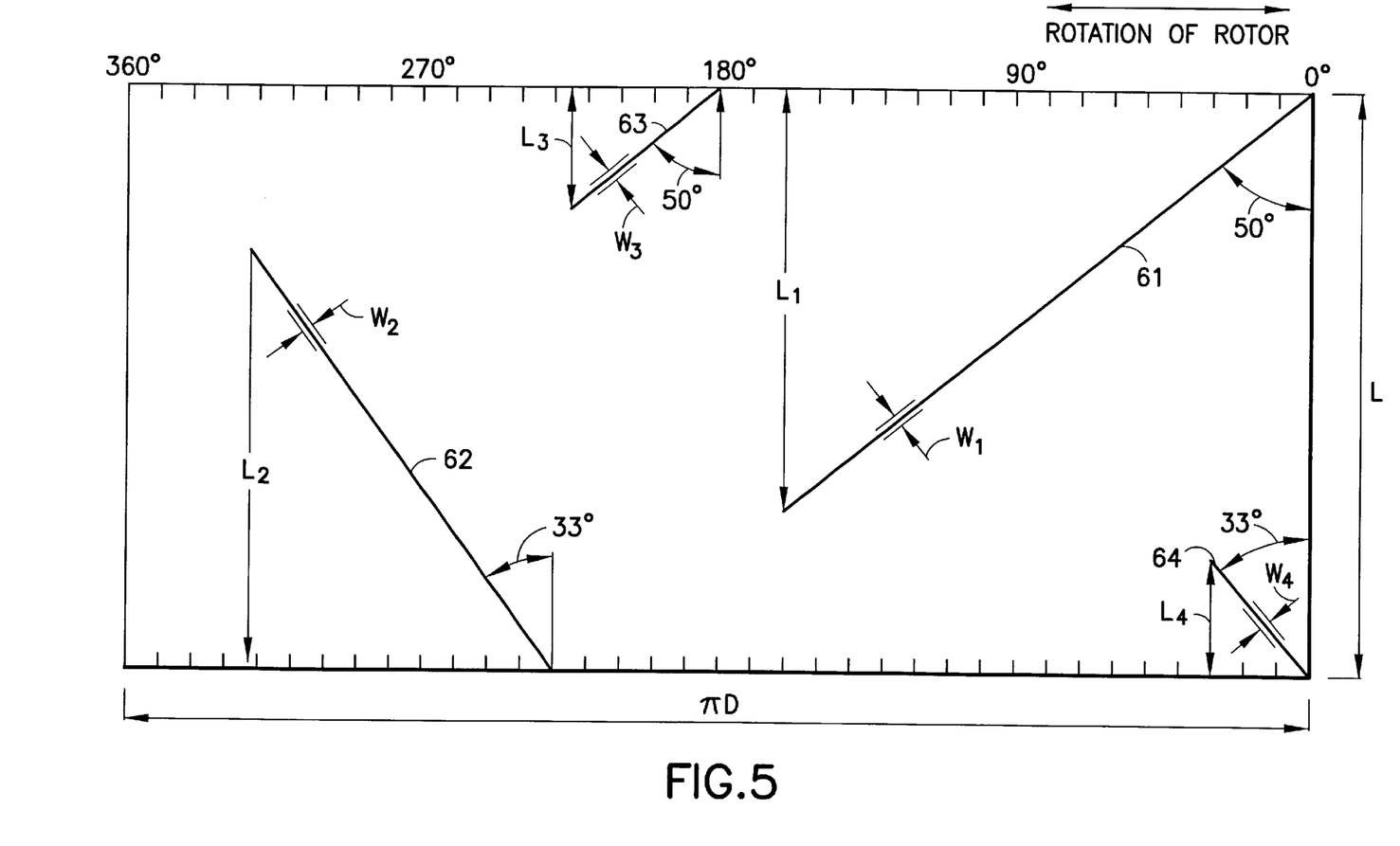
FIG. 5 is schematic view of a unwrapped rotor of this invention for the purpose of illustrating and explaining the rotors of this invention and wherein in this unwrapped form the helical wings of the rotor appear straight and diagonally oriented lines representing the centerlines of the wing tips.

In FIG. 2, the left and right rotors 21 and 22 are shown each having a rotor axial length "L" measured between their respective collar ends 57 and 58. The collar end 57 connected to the drive shaft 55 or 56 is the "driven end" of the rotor, the other collar end 58 being the "coolant end" or "water end". The rotors contain coolant passageways, and coolant, which is usually water, is fed into these passageways at the opposite ends from the location of the drive shafts 55 and 56. The rotor envelopes, defined by the tip diameter, each have a diameter "D" as shown if FIG. 3. Thus, the unwrapped length of each rotor envelope is "π D", as shown in FIG. 5. FIG. 3 illustrates the terminology used in connection with the description of the rotors of this invention.

Referring to FIGS. 4, 4A, 4B and 5, one embodiment of a rotor of this invention is illustrated. The rotor has its two long wings 61 and 62 originating from the opposite collar ends. The term "originating from" or similar language signifies that the leading end of the respective helical wing tip 61 or 62 is located at the designated collar end. The rotor axis is indicated at 60, and the angular positions 0 degree, 90 degree, 180 degree, 270 degree and 360 degree of the unwrapped rotor envelope are angular positions about the rotor axis. The 0 degree or 360 degree angular position is defined for convenience of explanation with reference to FIGS. 4, 4A, 4B and 5, as being that position on the rotor envelope adjacent to the central region 29 and lying on a horizontal plane containing the two rotor axes 60. This plane is also referred to hereafter as the window of interaction between the two rotors. Similarly, the rotor also has its two short wings 63 and 64 originating from opposite collar ends.

An unwrapped envelope of an illustrative rotor layout of this invention is shown in FIG. 5. In this FIG. the rotor wings are depicted by a centerline of the respective wing tips, with the width of the wing tips be illustrated in part. In the rotor 21 the first long wing 61 originates at one axial end of the rotor at about 0° angular position relative to the rotor axis and has a helix angle of 50°. The axial length $L_1$ of this first long wing is 73.3% of the rotor axial length L. The width of the wing tip of this wing is $W_1$. The wing width is measured normal or perpendicular to the helix angle of the wing. The second long wing 62 originates at the opposite axial end of the rotor at about 230° angular position relative to the rotor axis and has a helix angle of 33°. The axial length $L_2$ of this second long wing is 73.3% of the rotor axial length L. The width of the wing tip of this wing is $W_2$. The width $W_1$ is 55% greater than the width $W_2$. The first short wing 63 originates at the same axial end of the rotor as the first long wing 61, but at an angular position relative to the rotor axis of 180° and has a helix angle of 50°. The axial length $L_3$ of this first short wing is 20% of the rotor axial length L. The width of the wing tip of this wing is $W_3$. The second short wing 64 originates at the same axial end of the rotor as the second long wing 62, but has an angular position relative to the rotor axis of 5° and has a helix angle of 33°. The tip width of this wing is $W_4$. The width $W_3$ is 55% greater than the width $W_4$.

Figure 4:
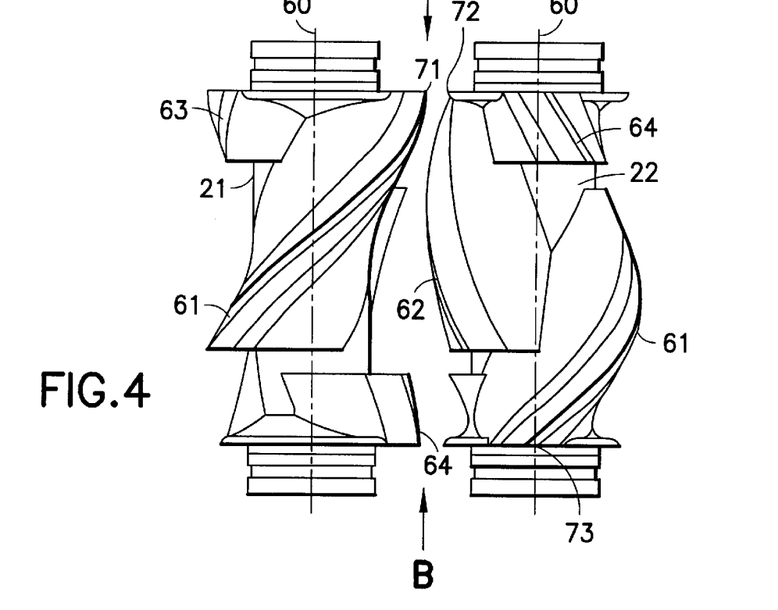
FIG. 4 is a plan view of two four wing rotors of this invention as oriented in the mixing machine, without showing the mixing machine.
Figure 4A:
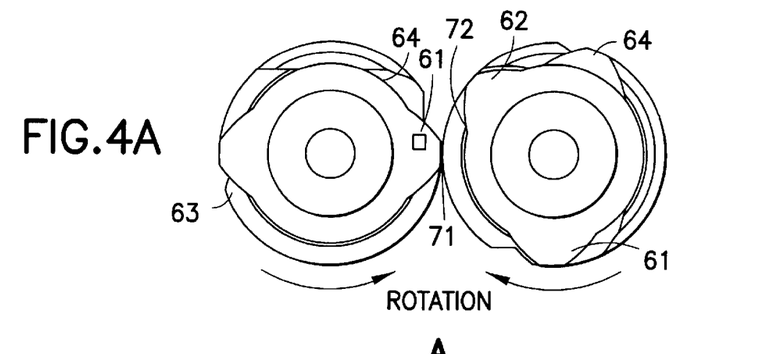
FIG. 4A is a side elevational view of the rotors of FIG. 4 looking in the direction of arrow A in FIG. 4.
Figure 4B:
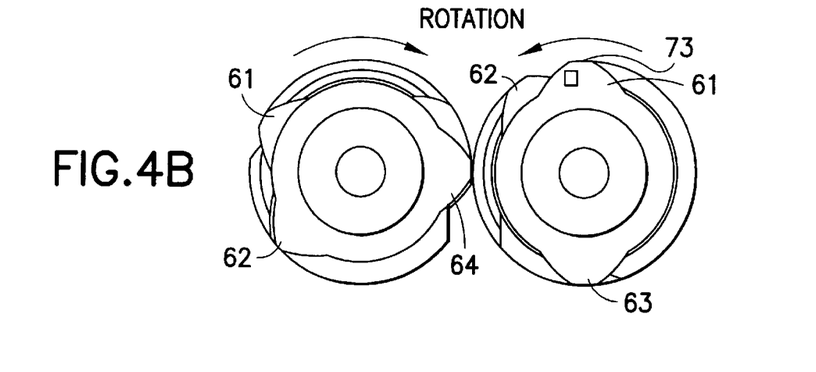
FIG. 4B is a side elevational view of the rotors of FIG. 4 looking in the direction of arrow B in FIG. 4.

FIGS. 4, 4A and 4B illustrates the relative orientation of the wings when two of the rotors are employed in an intensive, internal batch mixing machine, such as described in FIG. 1. One means of controlling the extensive mixing in such batch mixers is through the orientation of the rotor wings relative to one another such that the rotor wings of each rotor cross the window of interaction between the rotors in a predetermined configuration so as to force exchange of material from one chamber of the mixer to the other chamber of the mixer. The first long wing 61 of each rotor 21 and 22 with the relatively large helix angle and twist or axial length $L_1$ provides sweeping of the window of interaction between the two rotors. These flow patterns are further enhanced by the second long wings 62 and the two short wings 63 and 64 that are so designed that a rotor wing is always present in the window of interaction between the two rotors for the entire duration of each rotor rotation. A preferred rotor orientation has the originating point 71 of the first long wing 61 of the first rotor 21 entering the window of interaction between the rotors within an angular orientation of in the range of from 0° to 25° of the originating point 72 of entry of the second long wing 62 of the second rotor 22 into the window of interaction. In this arrangement, and as a result of the helix angles of the two rotor wings, each rotor wing provides an effective wiping of the processing surfaces of the adjacent rotor providing effective material renewal in these surfaces. The long and short rotor wings of the two rotors essentially completely wipe the entire region of the mixer in the space between the two rotors thus ensuring further enhancement of extensive mixing. It is further desired that the entrance of the origination point 71 of the first long wing of the one rotor 21 into the window of interaction trail the entrance of the origination point 73 of the first long wing 61 of the second rotor 22 by an angular position of from 90° to 180°. However, it will be appreciated that other rotor alignments are possible which will promote other aspects of the mixing process, such as material intake and discharge from the mixer.

In the rotors of this invention, the helix angle of the first long wing 61 is chosen to balance the amount of material that is allowed to pass over the rotor wing tip clearance and along the rotor wing length $L_1$ in the axial direction. A helix angle of from 45° to 60° for this first long wing ensures that in excess of 50% of the material accumulated in front of the rotor wing 61 is forced to flow in the axial direction, for enhanced extensive mixing and material temperature control. The remainder of the material accumulating in front of the rotor wing 61 progressively flows circumferentially over the rotor wing tip. Whereas proper selection of the rotor helix angle ensure the proper proportions of radial and axial material flow, the rotor wing twist length or its equivalent axial length of 60 to 80% of the rotor length controls the extent of the axial material flow. Thus, the rotors of this invention ensure that a significant proportion of the material accumulated in front of the first long rotor wing 61 will traverse the majority of the mixing chamber.

Placement of the second long wing 62 of the rotor at 220° to 240° angular position relative to the rotor axis allows material to be freely transferred from one rotor wing to the other. The helix angle of 20° to 40° for this wing 62 ensures that a substantial amount of material flows in the rotor radial clearance between the rotor wing tip and the inner housing wall of the mixing chamber.

Dispersive mixing is achieved by subjecting the material repeatedly to controlled stress over finite times. Among the design parameters that affect the stress level imposed on the material as it flows through the radial clearance between the rotor wing and the inner housing wall is the prevailing shear rates and material viscosity. The latter is characteristic of the molecular structure of the material being processed and the processing temperature. The rotors of this invention provide effective means by which this temperature can be effectively controlled. Whereas, the stress levels are shear rate and temperature dependent. The amount of material allowed to flow in the radial clearance between the rotor wing tip and the surface of the chamber wall is a function of the tip clearance and the approach angle in the working surface of the rotor wing. In this invention the design parameters of the rotor permits effective control over the amount of material passing through this section of the mixer Another means employed in the rotors of this invention to control mixing intensity is through the selection of the rotor wing tip width in accordance with the processing activity desired for each wing. Whereas, equal wing tip width can be utilized for the two long wings and/or for the two short wings, it is preferred that the wing width of the first long wing 61 be at least 50% greater, and up to about 100% greater, than the wing width of the second long wing 62. Similarly, it is preferred that the wing width of the first short wing 63 be at least 50% greater than the wing width of the second short wing 64. It has also been found desirable for the width of the first short wing 63 to be equal to the width of the first long wing 61 and for the width of the second short wing 64 to be equal to the width of the second long wing 62. Larger wing widths increase the intensity of the mixing since the duration of mixing as a result of the material shearing increases with the increasing rotor wing tip widths. If desired, linear variations in rotor wing width from the originating point of the rotor wing to the termination point of the rotor wing can be utilized to further optimize the mixing characteristics of each rotor wing.

The short wings 63 and 64 of the rotor of this invention act to divert the material away from the origination points of the wings of the rotor and thus away from end plates of the mixer chamber. These wings divert material away from the end plates and eliminate possible stagnation areas of relatively poor material flow, i.e., reduce the amount of material allowed to enter the region at the two rotor ends and thereby reducing wear experienced in these regions. The angular origination point of the wings and the axial length of the wings are chosen to achieve the aforesaid purposes while allowing free and un-interrupted flow of material along the circumference and axial length of the mixer.

Another feature of the rotors of this invention is the different approach angles for the rotor wings. The approach angle is the angle formed by the tangents to the inner wall of the chamber and the rotor working surface in the vicinity of the rotor wing tip. This "wedge" region formed in the vicinity of the rotor tip ensures an adequate flow of material over the wing tip. For the first long rotor 61 the approach angle varies between 25° to 60° and primarily promotes axial rather than circumferential material flow. The second long wing 62 approach angle varies between 15° and 25° and insures that the majority of material trapped in the wedge region of the rotor wing will be forced over the rotor wing through the radial clearance formed by the rotor wing tip and the inner wall of the chamber. In a preferred embodiment of this invention the approach angle of the first short wing 63 is at least 5°, preferably 5° to 15°, greater than the approach angle of the second short wing 64. Thus, the first short wing primarily promotes distributive mixing and the second short wing primarily promotes dispersive mixing.

In another feature of the rotors of this invention, the approach angles of the two long wings 61 and 62 can also be varied along the length of the two long rotor wings to influence the amount of material allowed to flow axially or circumferentially over each wing tip. For example, the approach angle for the first long rotor wing 61 could vary from a minimum of 60° at the originating point of the wing on the rotor to 25° at the termination point of the wing on the rotor, and for the second long wing 62 from an approach angle of 25° at its origination point to an approach angle of 15° at its termination point. Generally, the approach angle of the first long wing 61 will be at least 5°, preferably 5° to 15°, greater than the approach angle of the second long wing 62. Proper selection of the appropriate approach angles permits a further means to balance between distributive and dispersive mixing characteristics of each of these rotor wings and thereby of the system employing them.

The rotors of this invention produce increased productivity in internal, intensive mixing machines employing them. Moreover, they also produce products of greater uniformity and homogeneity in a shorter period of time. Productivity increases of generally at least 20% or more can be obtained with the rotors of this invention compared to the results obtained with prior art rotors. The rotors permit one to obtained reduced cycle time for the batch mixes, and also permits a significant reduction in the discharge temperature of material processed.

It will be appreciated by that the invention has been illustrated by certain embodiments thereof and that modification and changes thereto can be made without departing from the spirit and scope of the disclosed invention.

We claim:

1. A four wing rotor for use in an internal, intensive batch mixing machine, the rotor having an axis and an axial length from a first end of the rotor to an opposite second end of the rotor and having multiple wings of generally helical configuration including first and second long wings and first and second short wings;

the first long wing originating at the first end of the rotor at about 0° angular position relative to the rotor axis and having a wing tip oriented to the rotor axis at a helix angle of between about 45° and 60° and having an axial length of between about 60% to about 80% of the axial length of the rotor and an approach angle in the range of from about 25° to 60°;

the second long wing on the rotor originating at the second end of the rotor at about 220° to about 240° angular position relative to the rotor axis and having a wing tip oriented to the rotor axis at a helix angle of between about 20° to 40° and having an axial length of between about 60% to 80% of the axial length of the rotor and an approach angle of between about 15° and 25° with the proviso that the approach angle of the first long wing is greater than the approach angle of the second long wing by at least 5°;

the wing tips of each of the first and second long wings having a width, as measured normal to the helix angle of the wing, with the width of the first long wing tip being at least 50% wider than the width of the second long wing tip;

the first short wing on the rotor originating at the first end of the rotor at an angular position in the range of about 170° to about 190° relative to the rotor axis, having a wing tip oriented to the rotor axis at a helix angle in the range of from about 25° to 60°, and having an axial length of between about 10% and 30% of the axial length of the rotor;

the second short wing on the rotor originating at the second end of the rotor at an angular position in the range of about 350° to about 20° relative to the rotor axis, having a wing tip oriented to the rotor axis at a helix angle in the range of from about 25° to 60°, and having an axial length of between about 10% and 30% of the axial length of the rotor; and each of the first and second long wings and first and second short wings having their wing tips an essentially equivalent radial distance from the axis of the rotor.

2. A four wing rotor of claim 1 wherein the approach angle of the first long wing is greater than the approach angle of the second long wing by from about 5° to about 25°.

3. A four wing rotor of claim 1 wherein the approach angle of the first short wing is between about 25° to 40°, the approach angle of the second short wing is between about 15° and 25°, with the proviso that the approach angle of the first short wing is greater than the approach angle of the second short wing by at least 5°.

4. A four wing rotor of claim 3 wherein the approach angle of the first short wing is between about 25° to 40°, the approach angle of the second short wing is between about 15° and 25°, with the proviso that the approach angle of the first short wing is greater than the approach angle of the second short wing by at from 5° to about 15°.

5. A four wing rotor of claim 4 wherein the approach angle of the first short wing is essentially the same as the approach angle of the first long wing and the approach angle of the second short wing is essentially the same approach angle as the approach angle of the second long wing.

6. A four wing rotor of claim 5 wherein the approach angles of the first long wing and the first short wing are each about 29° and the approach angles of the second long wing and the second short wing are each about 19°.

7. A four wing rotor of claim 1 wherein the helix angles of the first long wing and the first short wing are each about 50° and the helix angles of the second long wing and the second short wing are each about 33°.

8. A four wing rotor of claim 6 wherein the helix angles of the first long wing and the first short wing are each about 50° and the helix angles of the second long wing and the second short wing are each about 33°.

9. A four wing rotor of claim 1 wherein each of the wing tips of first and second short wings having a width, with the width of the first short wing tip being at least 50% wider than the width of the second short wing tip.

10. A four wing rotor of claim 9 wherein the width of the first long wing tip is about 64% wider than the width of the second long wing tip, the width of the first short wing tip is about 64% wider than the width of the second short wing tip, with the width of the first short wing tip being essentially equal to the width of the first long wing tip and the width of the second short wing tip being essentially equal to the width of the second long wing tip.

11. A four wing rotor of claim 8 wherein each of the wing tips of first and second short wings having a width, as measures normal to the helix angle of the wing, with the width of the first short wing being at least 50% wider than the width of the second short wing tip.

12. A four wing rotor of claim 11 wherein the width of the first long wing tip is about 64% wider than the width of the second long wing tip, the width of the first short wing tip being about 64% wider than the width of the second short wing tip, with the width of the first short wing tip being essentially equal to the width of the first long wing tip and the width of the second short wing tip being essentially equal to the width of the second long wing tip.

13. A four wing rotor of claim 1 wherein the second long wing originates at about 230° angular position, the first short wing originates at about 180° angular position, and the second short wing originates at about 5° angular position relative to the rotor axis.

14. A four wing rotor of claim 8 wherein the second long wing originates at about 230° angular position, the first short wing originates at about 180° angular position, and the second short wing originates at about 5° angular position relative to the rotor axis.

15. A four wing rotor of claim 10 wherein the second long wing originates at about 230° angular position, the first short wing originates at about 180° angular position, and the second short wing originates at about 5° angular position relative to the rotor axis.

16. A four wing rotor of claim 12 wherein the second long wing originates at about 230° angular position, the first short wing originates at about 180° angular position, and the second short wing originates at about 5° angular position relative to the rotor axis.

17. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 1, the rotors being oriented in the respective cavities such that the first long wing of the first rotor originates at the driven end of the first rotor and the first long wing of the second rotor originates at the coolant end of the second rotor.

18. The mixing machine of claim 17 wherein the rotors are oriented in the mixing machine such that entry of the origination point of the first long wing of the one rotor into the window of interaction between the rotors trails entry of the origination point of the first long wing of or the other rotor by an angle of from 90° to 180°.

19. The mixing machine of claim 17 wherein the rotors are oriented in the mixing machine such that entry of the originating point of the first long wing of the first rotor into the window of interaction between the rotors is within an angular orientation in the range of from 0° to 25° of the entry of the originating point of entry of the second long wing 62 of the second rotor 22 into the window of interaction.

20. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 2, the rotors being oriented in the respective cavities such that the first long wing of the first rotor originates at the driven end of the first rotor and the first long wing of the second rotor originates at the coolant end of the second rotor.

21. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 3, the rotors being oriented in the respective cavities such that the first long wing of the first rotor originates at the driven end of the first rotor and the first long wing of the second rotor originates at the coolant end of the second rotor.

22. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 4, the rotors being oriented in the respective cavities such that the first long wing of the first rotor originates at the driven end of the first rotor and the first long wing of the second rotor originates at the coolant end of the second rotor.

23. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 5, the rotors being oriented in the respective cavities such that the first long wing of the first rotor originates at the driven end of the first rotor and the first long wing of the second rotor originates at the coolant end of the second rotor.

24. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 6, the rotors being oriented in the respective cavities such that the first long wing of the first rotor originates at the driven end of the first rotor and the first long wing of the second rotor originates at the coolant end of the second rotor.

25. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 7, the rotors being oriented in the respective cavities such that the first long wing of the first rotor originates at the driven end of the first rotor and the first long wing of the second rotor originates at the coolant end of the second rotor.

26. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 8, the rotors being oriented in the respective cavities such that the first long wing of the first rotor originates at the driven end of the first rotor and the first long wing of the second rotor originates at the coolant end of the second rotor.

27. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 9, the rotors being oriented in the respective cavities such that the first long wing of the first rotor originates at the driven end of the first rotor and the first long wing of the second rotor originates at the coolant end of the second rotor.

28. In an internal batch mixing machine including a housing defining a mixing chamber with respective cavities accommodating first and second non-intermeshing counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 10, the rotors being oriented in the respective cavities such that the first long wing of the first rotor originates at the driven end of the first rotor and the first long wing of the second rotor originates at the coolant end of the second rotor.

29. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 11, the rotors being oriented in the respective cavities such that the first long wing of the first rotor originates at the driven end of the first rotor and the first long wing of the second rotor originates at the coolant end of the second rotor.

30. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 12, the rotors being oriented in the respective cavities such that the first long wing of the first rotor originates at the driven end of the first rotor and the first long wing of the second rotor originates at the coolant end of the second rotor.

31. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 13, the rotors being oriented in the respective cavities such that the first long wing of the first rotor originates at the driven end of the first rotor and the first long wing of the second rotor originates at the coolant end of the second rotor.

32. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the two rotors comprise a rotor of claim 14, the rotors being oriented in the respective cavities such that the first long wing of the first rotor originates at the driven end of the first rotor and the first long wing of the second rotor originates at the coolant end of the second rotor.

33. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the four rotors comprise a rotor of claim 15, the rotors being oriented in the respective cavities such that the first long wing of the first rotor originates at the driven end of the first rotor and the first long wing of the second rotor originates at the coolant end of the second rotor.

34. In an internal batch mixing machine including a housing defining a mixing chamber with respective cavities accommodating first and second non-intermeshing, counter-rotating winged rotors on parallel axes in said cavities, said cavities communicating in a central region of the mixing chamber located generally between the said rotors to provide a window of interaction between said two rotors, wherein each rotor has a driven end and a opposite coolant end with the driven end of each rotor being adjacent each other in the cavities, the improvement wherein each of the four rotors comprise a rotor of claim 16, the rotors being oriented in the respective cavities such that the first long wing of the first rotor originates at the driven end of the first rotor and the first long wing of the second rotor originates at the coolant end of the second rotor.

* * * * *